United States Patent
Onodera et al.

(10) Patent No.: US 8,855,871 B2
(45) Date of Patent: Oct. 7, 2014

(54) ENGINE OVERRUN-PREVENTING CONTROL DEVICE FOR WORK VEHICLE

(75) Inventors: Yoshitaka Onodera, Hiratsuka (JP); Jun Hashimoto, Chigasaki (JP); Hideyuki Hiraiwa, Tochigi (JP); Shinji Kaneko, Oyama (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/640,604

(22) PCT Filed: Sep. 9, 2011

(86) PCT No.: PCT/JP2011/070587
§ 371 (c)(1),
(2), (4) Date: Nov. 30, 2012

(87) PCT Pub. No.: WO2012/033193
PCT Pub. Date: Mar. 15, 2012

(65) Prior Publication Data
US 2013/0218428 A1     Aug. 22, 2013

(30) Foreign Application Priority Data
Sep. 10, 2010  (JP) ................. 2010-203628

(51) Int. Cl.
| F16H 61/42 | (2010.01) |
| F16H 61/468 | (2010.01) |
| B60W 10/103 | (2012.01) |
| F16H 61/465 | (2010.01) |
| F16H 61/421 | (2010.01) |
| F16H 61/431 | (2010.01) |
| B60W 10/06 | (2006.01) |
| F16H 61/4157 | (2010.01) |
| F16H 59/36 | (2006.01) |
| F16H 59/68 | (2006.01) |

(52) U.S. Cl.
CPC ............ *B60W 10/06* (2013.01); *B60Y 2200/62* (2013.01); *B60W 10/103* (2013.01); *F16H 61/465* (2013.01); *F16H 2059/366* (2013.01); *Y02T 10/76* (2013.01); *F16H 2059/6861* (2013.01); *F16H 61/421* (2013.01); *F16H 61/431* (2013.01); *B60W 2510/1085* (2013.01); *F16H 61/4157* (2013.01)
USPC ................. 701/50; 701/51; 60/449

(58) Field of Classification Search
CPC ................................ F16H 61/4157
USPC ....................... 60/449; 477/68; 701/50, 51, 54
See application file for complete search history.

(56) References Cited

U.S. PATENT DOCUMENTS

| 4,368,798 | A | * | 1/1983 | Meyerle et al. ............... 180/307 |
| 4,696,380 | A | * | 9/1987 | Kita .............................. 192/221 |
| 5,111,658 | A | * | 5/1992 | Strenzke et al. ............... 60/327 |
| 5,145,238 | A | * | 9/1992 | Strenzke et al. ............... 303/10 |
| 6,360,537 | B1 | * | 3/2002 | Widemann ..................... 60/451 |
| 2004/0074691 | A1 | * | 4/2004 | Bombardier et al. ......... 180/307 |
| 2009/0259374 | A1 | * | 10/2009 | Weber et al. .................... 701/58 |
| 2009/0320462 | A1 | * | 12/2009 | Ohtsukasa ..................... 60/431 |
| 2010/0042301 | A1 | * | 2/2010 | Shimizu et al. ................ 701/58 |
| 2010/0083652 | A1 | * | 4/2010 | Fukuda et al. ................. 60/487 |
| 2010/0138118 | A1 | * | 6/2010 | Tsukada et al. ................ 701/50 |

FOREIGN PATENT DOCUMENTS

| CN | 101589251 A | 11/2009 | | |
| DE | 3800372 A1 | * 7/1989 | ............ | B60K 41/20 |
| DE | 4004773 A1 | * 8/1991 | ............ | B60K 17/10 |
| GB | 2205632 A | * 12/1988 | ............ | F16H 39/50 |
| GB | 2275761 A | * 9/1994 | ............ | F16H 61/42 |
| JP | 63305044 A | * 12/1988 | ............ | B60K 41/26 |
| JP | 02253055 A | * 10/1990 | ............ | F16H 61/40 |
| JP | B2 4-40535 | 7/1992 | | |
| JP | 05016710 A | * 1/1993 | ............ | B60K 41/20 |
| JP | A 11-173411 | 6/1999 | | |
| JP | A 2001-27319 | 1/2001 | | |
| JP | B2 3149167 | 3/2001 | | |
| JP | A 2001-235032 | 8/2001 | | |
| JP | A 2007-177798 | 7/2007 | | |
| JP | A 2009-24747 | 2/2009 | | |
| WO | WO 2008/123376 A1 | 10/2008 | | |

OTHER PUBLICATIONS

JPO machine translation of JP 05-16710 (original JP document published Jan. 26, 1993).*
EPO machine translation of DE 3800372 (original DE document published Jul. 20, 1989).*
JPO machine translation of JP Aug. 9308 B (original JP document published Jan. 31, 1996; corresponds to JP 63-305044 A).*
Dec. 20, 2011 International Search Report issued in International Patent Application No. PCT/JP2011/070587 (with translation).
Feb. 21, 2012 Refusing Reason Notice issued in Japanese Patent Application No. 2010-203628 (with English-language translation).
Jun. 5, 2012 Refusing Reason Notice issued in Japanese Patent Application No. 2010-203628 (with English-language translation).

* cited by examiner

*Primary Examiner* — Behrang Badii
*Assistant Examiner* — David Testardi
(74) *Attorney, Agent, or Firm* — Oliff PLC

(57) ABSTRACT

In an engine-overrun-preventing control device, if an engine speed exceeds a maximum speed, a minimum value of an inching rate is set such that higher the actual engine speed results in a higher minimum value of an inching rate. The hydraulic pump displacement is adjusted to obtain a higher inching rate between the minimum value of the inching rate and an inching rate set based on a brake stroke. If the engine speed exceeds a commanded speed and a pressure time-rate-of-change at the pump intake exceeds a prescribed value, the minimum value of the inching rate is set such that the higher the pressure time-rate-of-change, the higher the minimum value of the inching rate. The pump displacement is adjusted to obtain a higher inching rate between the minimum value of the inching rate set based on the pressure time-rate-of-change and the inching rate set based on the brake stroke.

4 Claims, 6 Drawing Sheets

US 8,855,871 B2

ENGINE OVERRUN-PREVENTING CONTROL DEVICE FOR WORK VEHICLE

TECHNICAL FIELD

The present invention relates to an engine-overrun-preventing control device for a work vehicle on which a hydro-static transmission (HST) is mounted.

BACKGROUND ARTS

As shown in FIG. 1, a work vehicle 1 such as a forklift is provided with a hydro-static transmission (HST) 17. In such a work vehicle 1, a speed change is performed by adjusting each tilt angle of a swash plate 16c of an HST hydraulic pump 16 and a swash plate 18c of an HST hydraulic motor 18 both of which the HST 17 comprises to change each displacement.

The HST-mounted work vehicle 1 is provided with accelerator operating means (such as an accelerator pedal) 25, brake operating means (such as a brake pedal) 26 and a working machine operating lever 6. When the accelerator operating means 25 is depressed, an engine 8 is controlled so as to obtain an engine speed Ne corresponding to an accelerator opening. The brake operating means 26 also has an inching function. When the brake operating means 26 is depressed, the swash plate 16c of the HST hydraulic pump 16 is adjusted so that, in accordance with the increase of a stroke S of the brake operating means 26, a mechanical brake ratio BR as the brake force of a brake device 22 as a mechanical brake increases and an inching rate IR decreases.

Here, the inching rate IR means a distribution ratio of a driving force of the engine 8 to the HST hydraulic pump 16. And, the more the inching rate IR decreases, the more the distribution ratio of the driving force of the engine 8 to the HST hydraulic pump 16 decreases and the more the distribution ratio to the working machine hydraulic pump 9 increases.

FIG. 2 shows a characteristic L1 of a relationship between the brake stroke S and the mechanical brake ratio BR, and a characteristic L2 of a relationship between the brake stroke S and the inching rate IR.

FIG. 3 shows characteristics L3 and L3' of a relationship between the engine speed Ne and an absorption torque T of the HST pump 16 and, when the inching rate IR decreases with a decrease in the displacement of the HST hydraulic pump 16, the characteristic L3 of a large absorption torque T indicated by a solid line changes accordingly to the characteristic L3' of a small absorption torque T indicated by a chain double-dashed line.

When an operator depresses the brake operating means 26, the mechanical brake ratio BR increases in accordance with the increase of the brake stroke 5, and the brake force of the brake device 22 increases in accordance with the characteristic L1 shown in FIG. 2. And, the displacement of the HST hydraulic pump 16 decreases in accordance with the increase of the brake stroke S and the inching rate IR decreases in accordance with the characteristic L2 shown in FIG. 2. Accordingly, the absorption torque T of the HST hydraulic pump 16 decreases as shown in FIG. 3. The absorption torque T of the HST hydraulic pump 16 is decreased in order to prevent engine stall. In FIG. 2, the section in which both the mechanical brake ratio BR and the inching rate IR are larger than zero is called a "lap section". The lap section is determined taking an operation feeling and the like of the brake operating means 26 into consideration so as to obtain optimum characteristics L1 and L2.

When the brake operating means 26 is depressed and the inching rate IR decreases, a reverse driving force (braking force) is transmitted from drive wheels 24 to the engine side to apply the engine brake, and the speed Ne of the engine 8 exceeds a prescribed maximum rotation speed NeH (overrun of the engine 8). This happens due to decrease in the displacement of the HST hydraulic pump 16.

The overrun of the engine 8 may damage the engine 8 and components (auxiliaries) around the engine 8 and thus, should be avoided.

Conventionally, the overrun of the engine 8 was prevented by advancing the action of the mechanical brake by the brake device 22 to absorb the driving force from the drive wheels 24 by the brake device 22. That is, in FIG. 2, a lap amount is formed largely by shifting the characteristic L1 to the left in the drawing to a characteristic L1" (indicated by a broken line) to raise the mechanical brake ratio BR in the early stage of the brake stroke S.

Patent references showing a general technical level related to the present invention are as follows.

The following Patent Reference 1 discloses an invention in which, if a work vehicle such as an HST-mounted wheel shovel shows a sign of overrun, a braking action is attained by increasing the displacement of a traveling motor to generate a brake pressure in a main circuit on the outlet side of the traveling motor, subjecting the brake pressure to torque conversion by a hydraulic pump, and absorbing it by the engine.

The following Patent Reference 2 discloses an invention in which a work vehicle such as an HST-mounted wheel shovel has a brake motor with a brake device connected to the drive shaft of a hydraulic pump, and if the vehicle has signs of overrun, the overrun is prevented by increasing the displacement of a traveling motor to generate a brake pressure in a main circuit on the outlet side of the traveling motor, increasing the displacement of the brake motor to absorb its torque by the engine, and generating brake torque.

Patent Reference 1: Japanese Patent Application Laid-Open No. 2001-235032
Patent Reference 2: Japanese Patent Application Laid-Open No. 2009-24747

DISCLOSURE OF THE INVENTION

Figure 1:
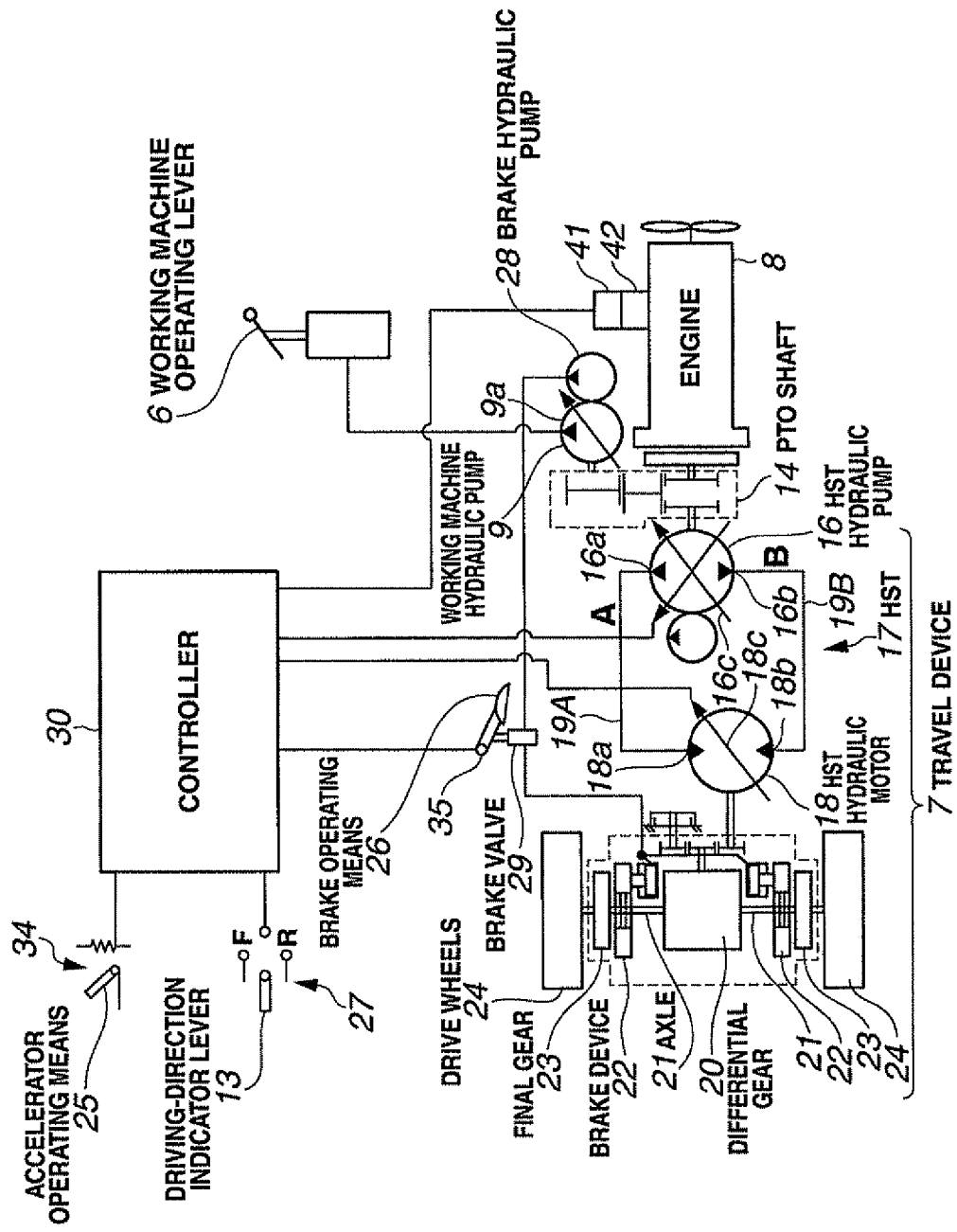
FIG. 1 is a diagram showing a structure of a power transmission system of a work vehicle.

Problems to be Solved by the Invention

It is assumed that a forklift as a work vehicle performs quick loading of a cargo while slowly approaching a platform.

In this case, the operator operates the accelerator operating means 25, the brake operating means 26 and the working machine operating lever 6 at the same time. Here, in FIG. 2, when the lap amount is formed largely by shifting the characteristic L1 to the left in the drawing to the characteristic L1" (indicated by the broken line) to raise the mechanical brake ratio BR in the early stage of the brake stroke S, the vehicle speed is adjusted while the brake is dragged against the operator's will to drive the drive wheels 24 at a prescribed very slow speed, resulting in increasing a mechanical loss and an energy loss. Therefore, there is a possibility that the fuel consumption amount increases (degradation in fuel efficiency) or the cooling capacity of the brake device 22 does not catch up. Therefore, there was a possibility that the cost increases to improve the cooling capacity of the brake device 22.

The present invention has been made in view of the above circumstances and makes it possible to solve problems such as degradation in fuel efficiency and degradation in cooling capacity of the brake device by suppressing an energy loss by preventing engine overrun without advancing the action of the mechanical brake.

Neither of the above Patent References suggest the above object and do not disclose a means required to prevent the engine overrun without advancing the action of the mechanical brake.

Means for Solving the Problem

A first invention relates to an engine-overrun-preventing control device for a work vehicle, comprising:
an engine,
a working machine hydraulic pump and an HST hydraulic pump which are driven by the engine used as a drive source,
a hydro-static transmission which is configured to include the HST hydraulic pump and transmits a driving force of the engine to drive wheels,
accelerator operating means,
engine speed control means for controlling the engine so as to obtain a commanded engine speed corresponding to an accelerator opening of the accelerator operating means,
brake operating means,
a brake device for braking the drive wheels by generating a brake force in accordance with a brake stroke of the brake operating means,
inching rate setting means for setting a correspondence relationship between the brake stroke of the brake operating means and an inching rate,
engine speed detection means for detecting an actual engine speed of the engine, and
pump displacement control means which, if the actual engine speed detected by the engine speed detection means is within a prescribed rotation speed, adjusts the displacement of the HST hydraulic pump so as to obtain an inching rate set by the inching rate setting means corresponding to the brake stroke of the brake operating means and which, if the actual engine speed detected by the engine speed detection means exceeds the prescribed rotation speed, adjusts the displacement of the HST hydraulic pump so as to obtain an inching rate higher than the inching rate set by the inching rate setting means corresponding to the brake stroke of the brake operating means.

A second invention relates to the engine-overrun-preventing control device for a work vehicle according to the first invention, wherein:
if the actual engine speed detected by the engine speed detection means exceeds the prescribed rotation speed, a minimum value of an inching rate is set such that the higher the actual engine speed is, the higher the minimum value of the inching rate is set, and the displacement of the HST hydraulic pump is adjusted so as to obtain a higher inching rate between the minimum value of the inching rate corresponding to the actual engine speed and the inching rate set by the inching rate setting means corresponding to the brake stroke of the brake operating means.

A third invention relates to an engine-overrun-preventing control device for a work vehicle, comprising:
an engine,
a working machine hydraulic pump and an HST hydraulic pump which are driven by the engine used as a drive source,
a hydro-static transmission which is configured to include the HST hydraulic pump and transmits a driving force of the engine to drive wheels,
accelerator operating means,
engine speed control means for controlling the engine so as to obtain a commanded engine speed corresponding to an accelerator opening of the accelerator operating means,
brake operating means,
a brake device for braking the drive wheels by generating a brake force in accordance with a brake stroke of the brake operating means,
inching rate setting means for setting a correspondence relationship between the brake stroke of the brake operating means and an inching rate, engine speed detection means for detecting an actual engine speed of the engine,
pressure time-rate-of-change measuring means for measuring a pressure time-rate-of-change on an intake side of the HST hydraulic pump, and
pump displacement control means which, if the actual engine speed detected by the engine speed detection is within the commanded engine speed, adjusts the displacement of the HST hydraulic pump so as to obtain an inching rate set by the inching rate setting means corresponding to the brake stroke of the brake operating means and which, if the actual engine speed detected by the engine speed detection means exceeds the commanded engine speed and if the pressure time-rate-of-change on the intake side of the HST hydraulic pump measured by the pressure time-rate-of-change measuring means becomes a prescribed value or more, adjusts the displacement of the HST hydraulic pump, so as to obtain an inching rate higher than the inching rate set by the inching rate setting means corresponding to the brake stroke of the brake operating means.

A fourth invention relates to the engine-overrun-preventing control device for a work vehicle according to the third invention, wherein:
if the actual engine speed detected by the engine speed detection means exceeds the commanded engine speed and if the pressure time-rate-of-change on the intake side of the HST hydraulic pump measured by the pressure time-rate-of-change measuring means becomes the prescribed value or more, a minimum value of an inching rate is set such that the higher the pressure time-rate-of-change rate is, the higher the minimum value of the inching rate is set, and the displacement of the HST hydraulic pump is adjusted so as to obtain a higher inching rate between the minimum value of the inching rate corresponding to the pressure time-rate-of-change and the inching rate set by the inching rate setting means corresponding to the brake stroke of the brake operating means.

Effects of the Invention

According to the first invention and the second invention, when the actual engine speed exceeds the prescribed rotation speed, the displacement of the HST hydraulic pump is adjusted so as to obtain the inching rate higher than the inching rate corresponding to the brake stroke. Therefore, in the overrun speed range of the engine, it becomes difficult to transmit the driving force from the drive wheels to the engine, and the engine overrun can be prevented.

According to the third invention and the fourth invention, when the actual engine speed exceeds the commanded engine speed and the pressure time-rate-of-change on the intake side of the HST hydraulic pump becomes the prescribed value or more, the displacement of the HST hydraulic pump is adjusted so as to obtain the inching rate higher than the inching rate corresponding to the brake stroke. Therefore, a sudden increase of the engine speed can be suppressed, and the engine overrun can be prevented.

BEST MODE FOR CARRYING OUT THE INVENTION

Embodiments of an engine overrun control device for a work vehicle according to the present invention are described below with reference to the drawings. A forklift is assumed as the work vehicle 1 below. But, the present invention can also be applied similarly to work vehicles other than the forklift.

Figure 4:
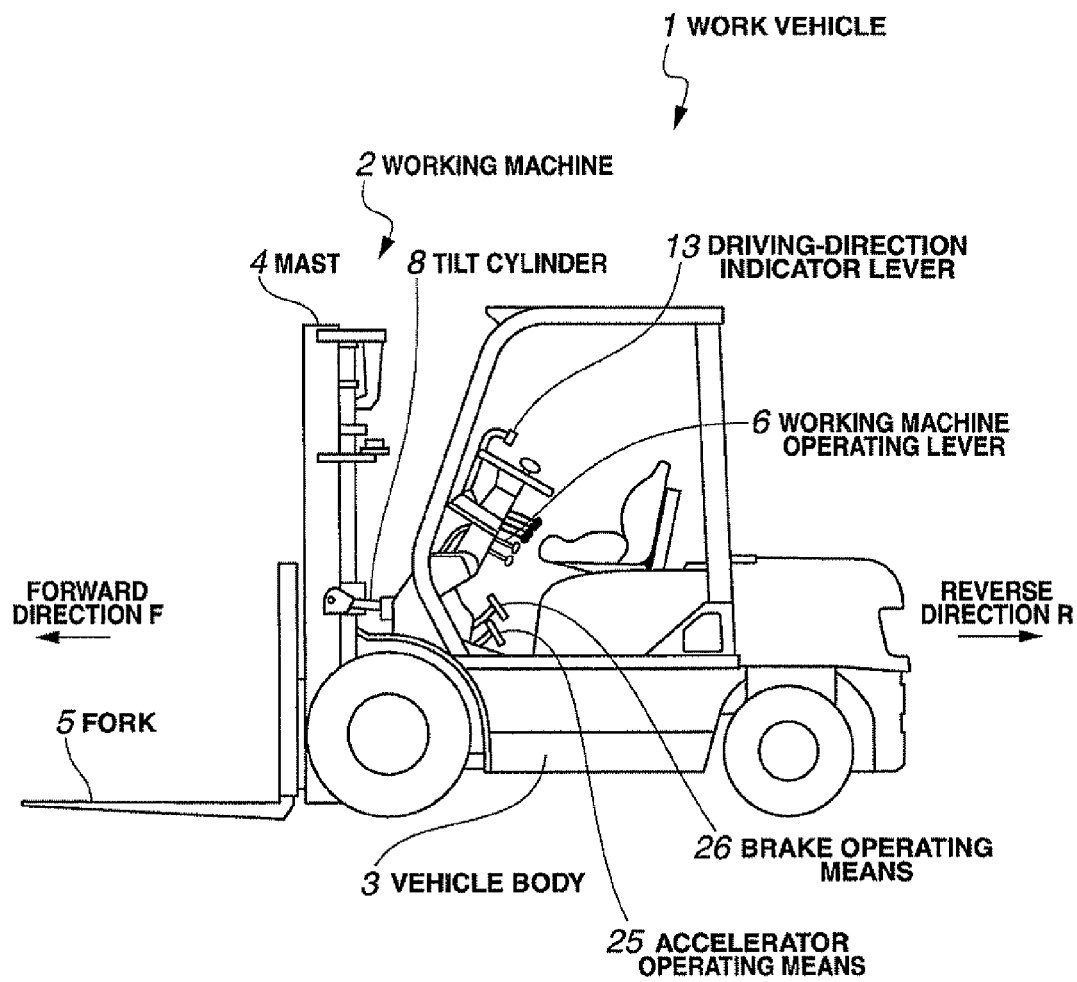
FIG. 4 is a side view of the vehicle body of a forklift as a work vehicle.

FIG. 4 is a side view of a vehicle body 3 of the forklift as the work vehicle 1, As shown in FIG. 4, a mast 4 and a fork 5 are disposed as a working machine 2 at the front of the vehicle body 3 of the work vehicle 1. The mast 4 is supported by the vehicle body 3 via a pair of right and left tilt cylinders 8.

At a driver seat, there are provided a working machine operating lever 6, a driving-direction indicator lever 13, an accelerator operating means 25, and a brake operating means 26. The accelerator operating means 25 and the brake operating means 13 are comprised of, for example, operating pedals.

The driving-direction indicator lever 13 indicates a travelling direction of the vehicle body 3 according to the operation, namely a forward direction F or a reverse direction R.

According to the operation of the working machine operating lever 6, the working machine 2 is driven to tilt the mast 4 and to lift the fork 5, and the position and posture of the cargo placed on the fork 5 can be changed to a desired position and posture.

Figure 5:
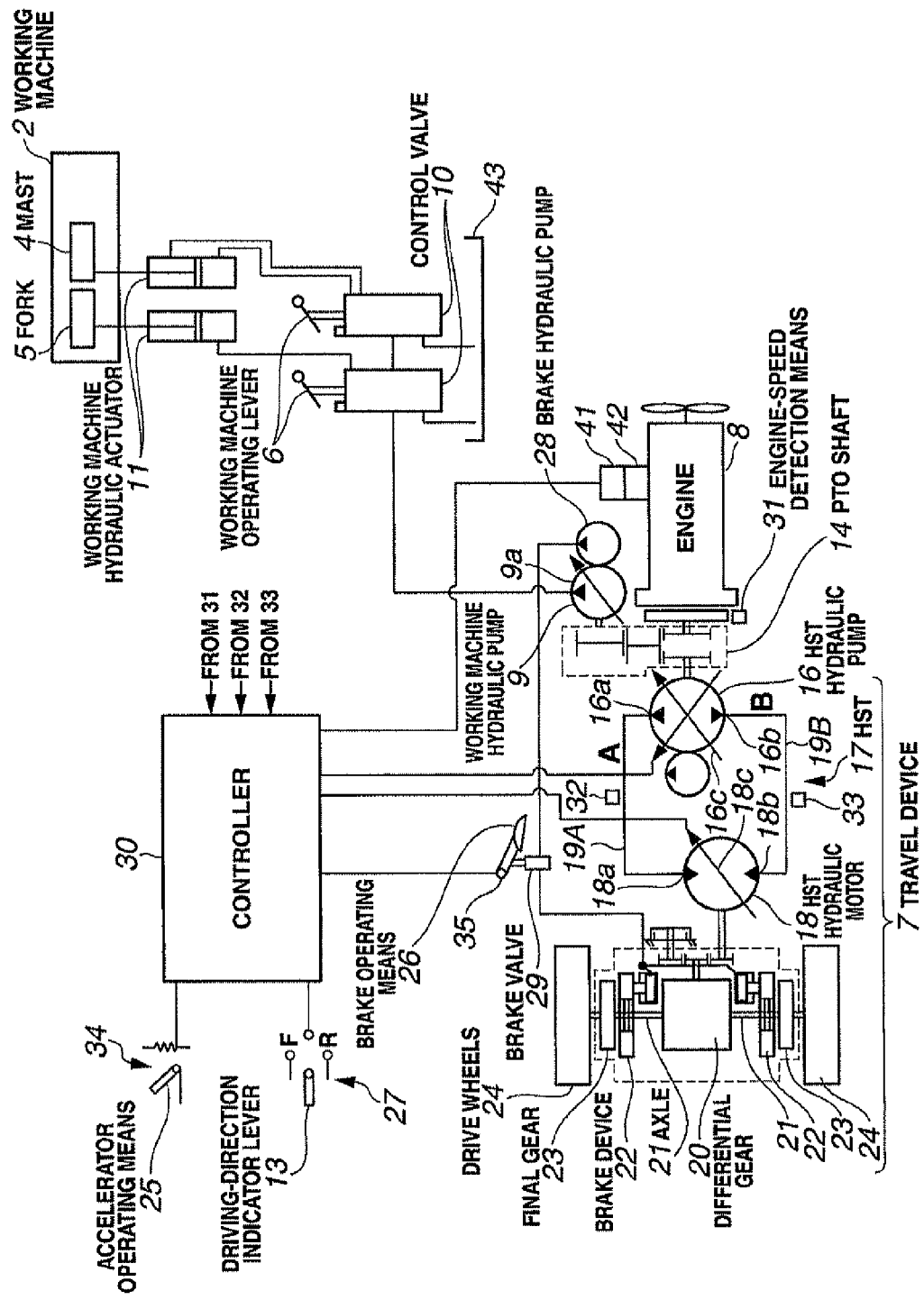
FIG. 5 is a diagram showing a structure of a power transmission system of a work vehicle of an embodiment.

FIG. 5 shows a structure of the power transmission system of the work vehicle 1 of an embodiment.

The work vehicle 1 is provided with a travel device 7 and the working machine 2. The travel device 7 is driven by an engine 8. The working machine 2 is operated by supplying the pressure oil discharged from a working machine hydraulic pump 9 driven by the engine 8 to a working machine hydraulic actuator 11 via a control valve 10. A degree of opening of the control valve 10 is variable according to the operation of the working machine operating lever 6.

When the accelerator operating means 25 is depressed, the engine 8 is controlled so as to obtain the engine speed Ne corresponding to the accelerator opening. The actual rotation speed No of the engine 8 is detected by an engine speed detection means 31.

The drive force of the engine 8 is transmitted to the working machine hydraulic pump 9 and the HST hydraulic pump 16 through a PTO shaft 14. The power transmission system ranging from the HST hydraulic pump 16 to the drive wheels 24 configures the travel device 7.

The hydro-static transmission (HST) 17 comprises the HST hydraulic pump 16, the HST hydraulic motor 18, and oil passages 19A and 19B which communicate respective ports 16a and 16b of the HST hydraulic pump 16 with respective flow-in and flow-out openings 18a and 18b of the HST hydraulic motor 18. For convenience of explanation, the port 16a of the HST hydraulic pump 16 is called a "port A", and the passage 19A which communicates the port 16a of the HST hydraulic pump 16 with the flow-in and flow-out opening 18a of the HST hydraulic motor 18 is called a "port A side passage". And, the port 16b of the HST hydraulic pump 16 is called a "port B", and the passage 19B which communicates the port 16b of the HST hydraulic pump 16 with the flow-in and flow-out opening 18b of the HST hydraulic motor 18 is called a "port B side passage".

The vehicle body 3 is moved forward or backward by switching the port on the discharge side of the HST hydraulic pump 16 to the port A or the port B. When the pressure oil is discharged from the port A 16a of the HST hydraulic pump 16, the vehicle body 3 is moved forward. At this time, the port B 16b of the HST hydraulic pump 16 becomes an intake-side port. When the pressure oil is discharged through the port B 16b of the HST hydraulic pump 16, the vehicle body 3 is moved backward. At this time, the port A 16a of the HST hydraulic pump 16 becomes an intake-side port. The port A side passage 19A is provided with a port A pressure sensor 32 for detecting a pressure (port A pressure) of the port A 16a of the HST hydraulic pump 16. The port B side passage 19B is provided with a port B pressure sensor 33 for detecting a pressure (port B pressure) of the port B 16b of the HST hydraulic pump 16.

The speed change is performed by adjusting each tilt angle of a swash plate 16c of the HST hydraulic pump 16 and a swash plate 18c of the HST hydraulic motor 18 to change each displacement.

The drive force of the HST hydraulic motor 18 is transmitted to an axle 21 via a differential gear 20. The axle 21 is provided with a braking device 22 and a final gear 23 as a mechanical brake. The output shaft of the final gear 23 is coupled with the drive wheels 24. Therefore, while the engine 8 is operating, when the accelerator operating means 25 is depressed and the driving-direction indicator lever 13 is operated in the forward direction F or the reverse direction R, the drive wheels 24 are rotationally driven and the vehicle body 3 moves forward or backward.

When the driving-direction indicator lever 13 is operated to indicate the forward direction F, the pressure oil is discharged from the port A 16a of the HST hydraulic pump 16, and the vehicle body 3 moves forward. And, when the driving-direction indicator lever 13 is operated to indicate the reverse direction R, the pressure oil is discharged from the port B 16b of the HST hydraulic pump 16, and the vehicle body 3 moves backward.

The drive shaft of the working machine hydraulic pump 9 is coupled with a brake hydraulic pump 28 and the brake hydraulic pump 28 is driven by the engine 8 used as a drive source. The pressure oil discharged from the brake hydraulic pump 28 is supplied to the brake device 22 via a brake valve 29. The degree of opening of the brake valve 29 increases according to an increase of an operation amount of the brake operating means 26, namely an increase of the brake stroke S, and accordingly, the oil quantity supplied from the brake hydraulic pump 28 to the brake device 22 increases, and the brake force generated by the brake device 22 increases. To be specific, when the brake operating means 26 is depressed, the mechanical brake ratio BR increases in accordance with the increase of the brake stroke S as its depressed amount, and the brake force generated by the brake device 22 increases.

In addition, when the brake operating means 26 is depressed, the displacement of the HST hydraulic pump 16 is decreased in accordance with the increase of the brake stroke S as its depressed amount, and the absorption torque T of the HST hydraulic pump 16 decreases. That is, when the brake operating means 26 is depressed, the swash plate 16c of the HST hydraulic pump 16 is adjusted so as to decrease the inching rate IR.

Therefore, the larger the brake stroke S of the brake operating means 26 becomes, the smaller the driving force transmitted from the engine 8 to the drive wheels 24 becomes and the larger the brake force generated by the brake device 22 becomes, and the vehicle body 3 can be put in a stopped state.

As stated above, the brake operating means 26 also has an inching function.

Here, the inching rate IR means a distribution ratio of the driving force of the engine 8 to the HST hydraulic pump 16, and the more the inching rate IR decreases, the more the distribution ratio of the driving force of the engine 8 to the HST hydraulic pump 16 decreases and the more the distribution ratio to the working machine hydraulic pump 9 increases.

Figure 2:
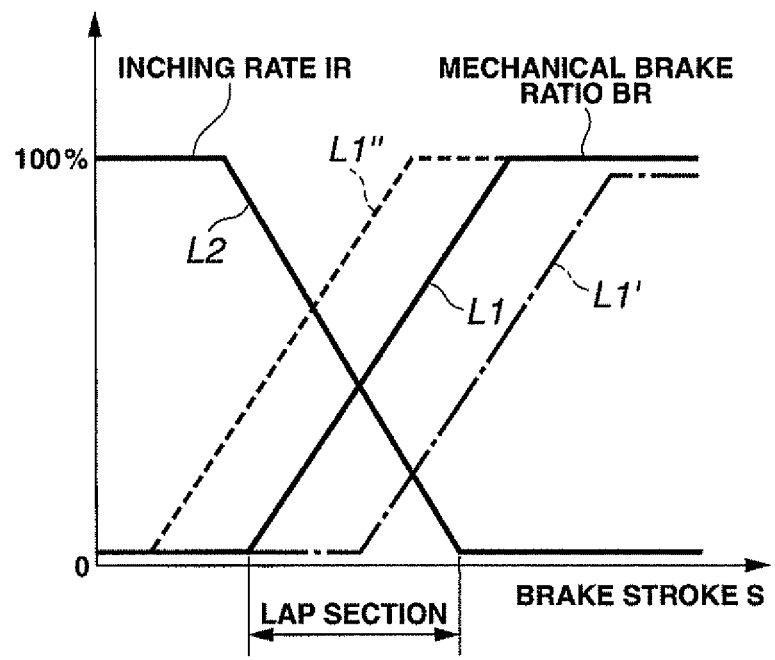
FIG. 2 is a diagram showing a characteristic of a relationship between a brake stroke and a mechanical brake ratio and a characteristic of a relationship between a brake stroke and an inching rate.

FIG. 2 shows the characteristic L1 of the relationship between the brake stroke S and the mechanical brake ratio BR, and the characteristic L2 of the relationship between the brake stroke S and the inching rate IR.

Figure 3:
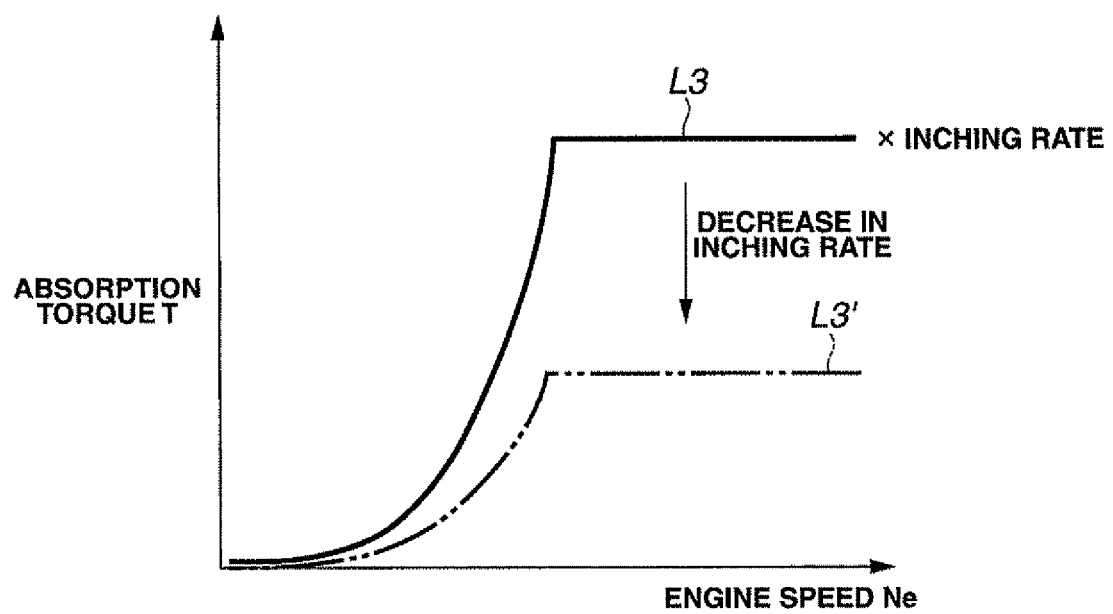
FIG. 3 is a diagram showing a characteristic of a relationship between an engine speed and an absorption torque of an HST pump.

FIG. 3 shows the characteristics L3 and L3' of the relationship between the engine speed Ne and the absorption torque T of the HST pump 16, and when the inching rate IR decreases with a decrease in the displacement of the HST hydraulic pump 16, the characteristic L3 of the large absorption torque T indicated by the solid line changes accordingly to the characteristic L3' of the small absorption torque T indicated by the chain double-dashed line.

When the operator depresses the brake operating means 26, the mechanical brake ratio BR increases in accordance with the increase of the brake stroke S, and the brake force of the brake device 22 increases in accordance with the characteristic L1 shown in FIG. 2. And, the displacement of the HST hydraulic pump 16 decreases in accordance with the increase of the brake stroke S, and the inching rate IR decreases in accordance with the characteristic L2 shown in FIG. 2. Accordingly, the absorption torque T of the HST hydraulic pump 16 decreases as shown in FIG. 3. The absorption torque T of the HST hydraulic pump 16 is decreased in order to prevent engine stall. In FIG. 2, the section in which both the mechanical brake ratio BR and the inching rate IR are larger than zero is called a "lap section". The lap section is determined taking an operation feeling and the like of the brake operating means 26 into consideration so as to obtain the optimum characteristics L1 and L2.

When the brake operating means 26 is depressed and the inching rate IR decreases, a reverse driving force (braking force) is transmitted from drive wheels 24 to the engine 8 side to apply the engine brake, and the speed Ne of the engine 8 exceeds a prescribed maximum rotation speed NeH (overrun of the engine 8). This happens due to decrease in the displacement of the HST hydraulic pump 16.

When the brake operating means 26 is depressed and the inching rate IR decreases, the driving force (braking force) is transmitted from the drive wheels 24 to the engine 8 to apply the engine brake and the speed Ne of the engine 8 might exceed (overrun of the engine 8) the prescribed maximum rotation speed NeH. This happens due to decrease in the displacement of the HST hydraulic pump 16.

The overrun of the engine S may damage the engine 8 and the components (auxiliaries) around the engine 8 and thus, should be avoided. In this embodiment, the overrun of the engine 8 is prevented without advancing the action of the mechanical brake by the brake device 22. This engine overrun preventing control is described below with reference to FIG. 6.

Figure 6:
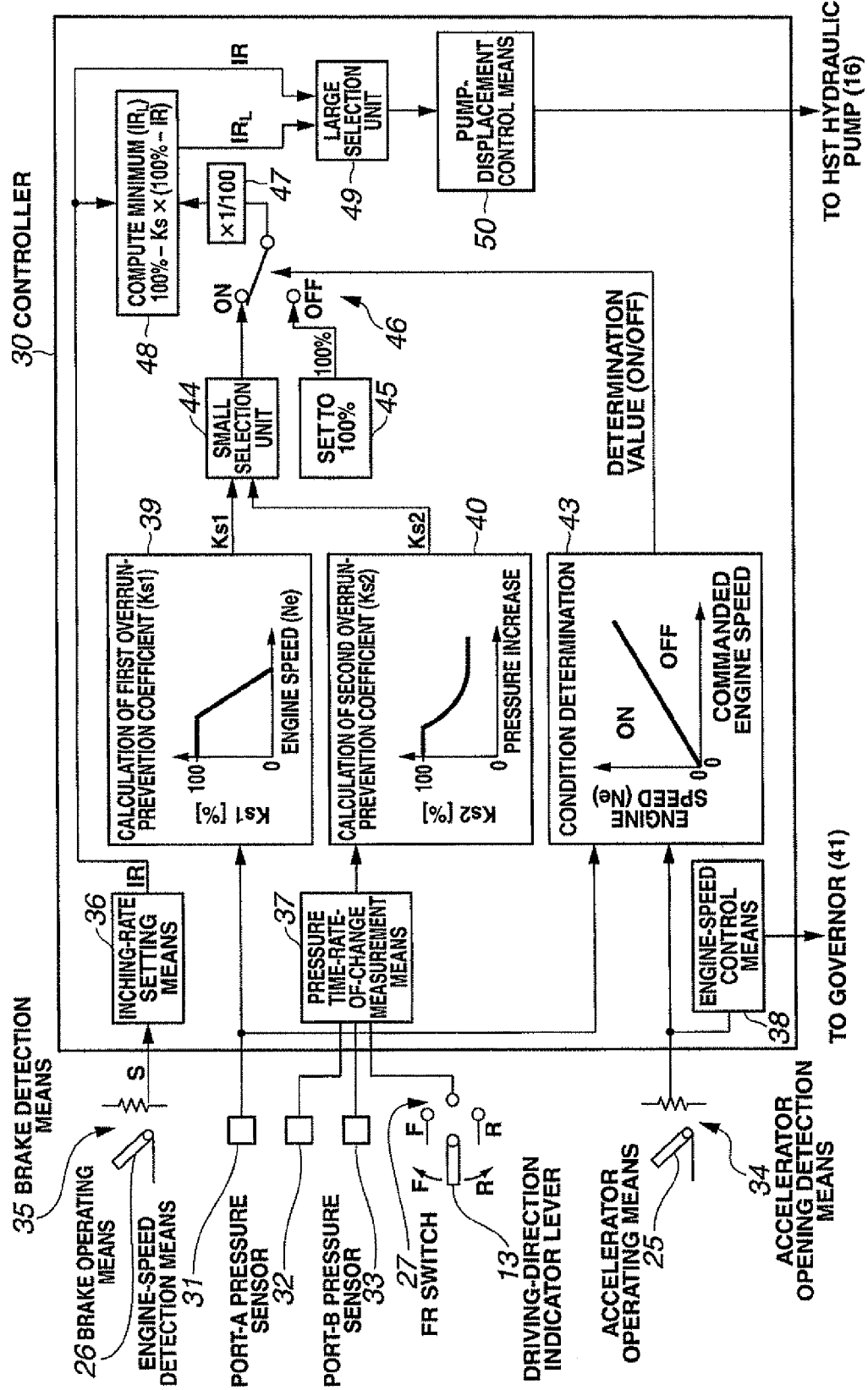
FIG. 6 is a diagram showing a structure of a control system of a work vehicle of an embodiment.

FIG. 6 shows a structure of a control system of the work vehicle 1.

The brake operating means 26 is provided with braking detection means 35 for detecting the brake stroke S. The braking detection means 35 is comprised of, for example, a potentiometer. The detection signal of the braking detection means 35 is input to a controller 30.

The signal indicating the actual rotation speed Ne of the engine 8 detected by the engine speed detection means 31 is input to the controller 30.

The detection signals of the port A pressure sensor 32 and the port B pressure sensor 33 are input to the controller 30.

The driving-direction indicator lever 13 is provided with an FR switch 27 for detecting that the traveling direction indicator lever 13 indicates the forward direction F or the reverse direction R or it is positioned in the neutral position N. The detection signal of the FR switch 27 is input to the controller 30.

The accelerator operating means 25 is provided with an accelerator opening detection means 34 for detecting the accelerator opening as the depressed amount. The accelerator opening detection means 34 is comprised of, for example, a potentiometer. The detection signal of the accelerator opening detection means 34 is input to the controller 30.

The controller 30 is provided with inching rate setting means 36, pressure time-rate-of-change measuring means 37, engine speed control means 38, a first overrun prevention coefficient calculation unit 39, a second overrun prevention coefficient calculation unit 40, a condition determination unit 43, a small selection unit 44, a 100% setting unit 45, an ON/OFF changeover unit 46, a 1/100 multiplication unit 47, a minimum value computation unit 48, a large selection unit 49, and pump displacement control means 50.

In the inching rate setting means 36, a correspondence relationship between the brake stroke S and the inching rate IR, namely the characteristic L2 shown in FIG. 2 is set. The signal indicating the present brake stroke S which is detected by the braking detection means 35 is input to the inching rate setting means 36, and the inching rate IR corresponding to the present brake stroke S is read from the characteristic L2. The read inching rate IR is input to the minimum value computation unit 48 and the large selection unit 49.

The signal indicating the actual rotation speed Ne of the engine 8, which is detected by the engine speed detection means 31, is input to the first overrun prevention coefficient calculation unit 39 and the condition determination unit 43.

The pressure time-rate-of-change measuring means 37 measures a pressure time-rate-of-change of a port pressure of the intake-side port of the HST hydraulic pump 16. The pressure time-rate-of-change measuring means 37 performs a measurement based on the individual detection signals of the port A pressure sensor 32, the port B pressure sensor 33 and the FR switch 27.

To be specific, in the case where the forward direction F is detected by the FR switch 27, a pressure rise portion per unit time ($kg/cm^2$) of the port B pressure detected by the port B pressure sensor 33 is measured because the intake-side port of the HST hydraulic pump 16 is the port B 16b. The unit time is, for example, a cycle of control. Similarly, in the case where the reverse direction R is detected by the FR switch 27, the pressure rise portion per unit time ($kg/cm^2$) of the port A pressure detected by the port A pressure sensor 32 is measured because the intake-side port of the HST hydraulic pump 16 is the port A 16a. The pressure rise portion per unit time (kg/cm²) at the intake-side port of the measured HST hydraulic pump 16 is input to the second overrun prevention coefficient calculation unit 40.

The signal indicating the accelerator opening detected by the accelerator opening detection means 34 is input to the engine speed control means 38 and the condition determination unit 43.

The engine speed control means 38 determines the commanded engine speed corresponding to the accelerator opening of the accelerator operating means 25. And, the engine 8 is controlled so as to obtain the commanded engine speed. Here, the commanded engine speed is not set to a rotation speed exceeding the maximum rotation speed NeH of the engine 8, namely the rotation speed in the engine overrun range.

The engine 8 is controlled by the engine speed control means 38, the governor 41 and the fuel injection pump 42.

The engine speed control means 38 generates a control command to obtain the commanded engine speed and outputs it to the governor 41.

The governor 41 generates a fuel injection amount command to obtain the commanded engine speed which is given as the control command and outputs it to the fuel injection pump 42. The fuel injection pump 42 injects the fuel to the engine 8 so as to obtain the fuel injection amount which is given as the fuel injection amount command.

The pump displacement control means 50 performs the following control.

1) If the actual engine speed Ne detected by the engine speed detection means 31 is within the maximum rotation speed NeH of the engine 8, the displacement of the HST hydraulic pump 16 is adjusted so as to obtain the inching rate IR, set by the inching rate setting means 36 corresponding to the brake stroke S of the brake operating means 26.

2) If the actual engine speed Ne detected by the engine speed detection means 31 exceeds the maximum rotation speed NeH of the engine 8, the displacement of the HST hydraulic pump 16 is adjusted so as to obtain an inching rate IRL higher than the inching rate IR set by the inching rate setting means 36 corresponding to the brake stroke S of the brake operating means 26.

The control of the above 2) is specifically performed according to the following 3).

3) If the actual engine speed Ne detected by the engine speed detection means 31 exceeds the maximum rotation speed NeH of the engine 8, the minimum value IRL of the inching rate is set such that the higher the actual engine speed Ne is, the higher the minimum value IRL of the inching rate is set, and the displacement of the HST hydraulic pump 16 is adjusted so as to obtain a higher inching rate between the minimum value IRL of the inching rate corresponding to the actual engine speed Ne and the inching rate IR set by the inching rate setting means 36 corresponding to the brake stroke S of the brake operating means 26.

4) If the actual engine speed Ne detected by the engine speed detection means 31 is within the commanded engine speed, the displacement of the HST hydraulic pump 16 is adjusted so as to obtain the inching rate IR set by the inching rate setting means 36 corresponding to the brake stroke S of the brake operating means 26.

5) If the actual engine speed Ne detected by the engine speed detection means 31 exceeds the commanded engine speed and the pressure time-rate-of-change on the intake side of the HST hydraulic pump 16 measured by the pressure time-rate-of-change measuring means 37 becomes a prescribed value or more, the displacement of the HST hydraulic pump 16 is adjusted so as to obtain the inching rate IRL higher than the inching rate IR set by the inching rate setting means 36 corresponding to the brake stroke S of the brake operating means 26.

The control of the above 5) is specifically performed according to the following 6).

6) If the actual engine speed Ne detected by the engine speed detection means 31 exceeds the commanded engine speed and if the pressure time-rate-of-change on the intake side of the HST hydraulic pump 16 measured by the pressure time-rate-of-change measuring means 37 becomes the prescribed value or more, the minimum value IRL of the inching rate is set such that the higher the pressure time-rate-of-change rate is, the higher the minimum value IRL of the inching rate is set, and the displacement of the HST hydraulic pump 16 is adjusted so as to obtain a higher inching rate between the minimum value IRL of the inching rate corresponding to the pressure time-rate-of-change and the inching rate IR set by the inching rate setting means 36 corresponding to the brake stroke S of the brake operating means 26.

That is, the first overrun prevention coefficient calculation unit 39 calculates a first overrun prevention coefficient ks1 according to the actual engine speed Ne. If the engine speed Ne is within the maximum rotation speed NeH of the engine 8, the first overrun prevention coefficient ks1 becomes 100%. If the actual engine speed Ne exceeds the maximum rotation speed NeH of the engine 8 to reach an engine overrun rotation speed range, the higher the actual engine speed Ne becomes, the smaller the first overrun prevention coefficient ks1 becomes, and if the first overrun prevention coefficient ks1 reaches the minimum value 0%, the minimum value 0% is kept at a higher rotation speed.

The first overrun prevention coefficient ks1 calculated by the first overrun prevention coefficient calculation unit 39 is input to the small selection unit 44.

The second overrun prevention coefficient calculation unit 40 calculates a second overrun prevention coefficient ks2 according to the pressure rise portion per unit time (kg/cm²) at the intake-side port of the HST hydraulic pump 16. If the pressure rise portion is smaller than the prescribed value, the second overrun prevention coefficient ks2 becomes 100%. If the pressure rise portion is not less than the prescribed value, the higher the pressure rise portion becomes, the smaller the second overrun prevention coefficient ks2 becomes. For example, if it becomes a prescribed pressure rise portion or more, the second overrun prevention coefficient ks2 saturates and keeps a fixed value.

The second overrun prevention coefficient ks2 calculated by the second overrun prevention coefficient calculation unit 40 is input to the small selection unit 44.

The small selection unit 44 selects a smaller one of the first overrun prevention coefficient ks1 and the second overrun prevention coefficient ks2.

The 100% setting unit 45 sets a numerical value "100%".

The condition determination unit 43 determines a commanded engine speed corresponding to the accelerator opening of the accelerator operating means 25. And, it is determined whether the actual engine speed Ne detected by the engine speed detection means 31 is within the commanded engine speed (OFF) or the actual engine speed Ne detected by the engine speed detection means 31 exceeds the commanded engine speed (ON). This determination is made for determining whether or not the driving force (braking force) is transmitted from the drive wheels 24 to the engine 8. When the actual engine speed Ne is within the commanded engine speed, it is determined that the driving force (braking force) is not transmitted from the drive wheels 24 to the engine 8 and that there is no possibility of causing engine overrun, and a determined value OFF is output. And, when the actual engine speed Ne exceeds the commanded engine speed, it is determined that the driving force (braking force) is transmitted from the drive wheels 24 to the engine 8 and that there is a possibility of causing engine overrun, and a determined value ON is output.

The ON/OFF changeover unit 46 performs a switching operation according to the ON/OFF determined value made by the condition determination unit 43.

If the determined value is OFF, the ON/OFF changeover unit 46 is switched to OFF, and the numerical value "100%" set by the 100% setting unit 45 is input to the 1/100 multiplication unit 47.

If the determined value is ON, the ON/OFF changeover unit 46 is switched to ON, and the first overrun prevention coefficient ks1 or the second overrun prevention coefficient ks2 selected by the small selection unit 44 is input to the 1/100 multiplication unit 47.

The 1/100 multiplication unit 47 multiplies the input numerical value (100% or the first overrun prevention coefficient ks1 or the second overrun prevention coefficient ks2) by "1/100". The multiplied result is input as an overrun prevention coefficient ks to the minimum value computation unit 48.

According to the inching rate IR input by the inching rate setting means 36 and the overrun prevention coefficient ks input by the 1/100 multiplication unit 47, the minimum value computation unit 48 performs the following computation to determine an inching rate minimum value IRL.

$$IRL=100\%-ks\times(100\%-IR) \quad (1)$$

The computed inching rate minimum value IRL is input to the large selection unit 49.

The large selection unit 49 selects a larger one of the inching rate IR input from the inching rate setting means 36 and the inching rate minimum value IRL input from the minimum value computation unit 48. The inching rate IR or the inching rate minimum value IRL selected by the large selection unit 49 is input to the pump displacement control means 50.

Examples of the above-described controls 1) to 6) are described below.

Example 1

If the determined value OFF is output from the condition determination unit 43, the pump displacement control means 50 adjusts the displacement of the HST hydraulic pump 16 so as to obtain the inching rate IR corresponding to the brake stroke S set by the inching rate setting means 36. This means that the above-described control 1) or 4) is performed.

Example 2

Even when the determined value ON is output from the condition determination unit 43, the pump displacement control means 50 adjusts the displacement of the HST hydraulic pump 16 so as to obtain the inching rate IR corresponding to the brake stroke S which is set by the inching rate setting means 36, if the first overrun prevention coefficient ks1 is 100% output from the first overrun prevention coefficient calculation unit 39 and the second overrun prevention coefficient ks2 is 100% output from the second overrun prevention coefficient calculation unit 40. This means that the above-described control 1) or 4) is performed. The state that the determined value ON is output from the condition determination unit 43 and the first overrun prevention coefficient ks1 is 100% output from the first overrun prevention coefficient calculation unit 39 is a state that, for example, the driving force (braking force) is transmitted from the drive wheels 24 to the engine 8 side but has not reached the engine overrun rotation speed range. And, the state that the determined value ON is output from the condition determination unit 43 and the second overrun prevention coefficient ks2 is 100% output from the second overrun prevention coefficient calculation unit 40 is a state that, for example, the driving force (braking force) is transmitted from the drive wheels 24 to the engine 8 side but the pressure rise portion has not reached the prescribed value.

Example 3

When the determined value ON is output from the condition determination unit 43 (actual engine speed Ne exceeds the maximum rotation speed NeH) and the first overrun prevention coefficient ks1 which is smaller than 100% is output from the first overrun prevention coefficient calculation unit 39, the pump displacement control means 50 adjusts the displacement of the HST hydraulic pump 16 so as to obtain the inching rate minimum value IRL computed by the minimum value computation means 48. This means that the above-described control 2) or 3) is performed.

Example 4

When the determined value ON is output from the condition determination unit 43 (actual engine speed Ne exceeds the commanded engine speed) and the second overrun prevention coefficient ks2 which is smaller than 100% is output from the second overrun prevention coefficient calculation unit 40, the pump displacement control means 50 adjusts the displacement of the HST hydraulic pump 16 so as to obtain the inching rate minimum value IRL computed by the minimum value computation means 48. This means that the above-described control 5) or 6) is performed.

Example 5

When the determined value ON is output from the condition determination unit 43 (actual engine speed Ne exceeds the maximum rotation speed NeH) and the first overrun prevention coefficient ks1 which is smaller than 100% is output from the first overrun prevention coefficient calculation unit 39, and the second overrun prevention coefficient ks2 which is smaller than 100% is output from the second overrun prevention coefficient calculation unit 40, the pump displacement control means 50 adjusts the displacement of the HST hydraulic pump 16 so as to obtain the inching rate minimum value IRL computed by the minimum value computation means 48. This means that the above-described controls 2) or 3) and 5) or 6) are performed.

When the first overrun prevention coefficient ks1 which is smaller than 100% is output from the first overrun prevention coefficient calculation unit 39 and the second overrun prevention coefficient ks2 which is smaller than 100% is output from the second overrun prevention coefficient calculation unit 40, a smaller one of the two values is selected, and the inching rate minimum value IRL is computed based on the selected value. This is for improving the effect of suppressing the engine overrun by selecting the smaller one.

In FIG. 6, both the first overrun prevention coefficient calculation unit 39 and the second overrun prevention coefficient calculation unit 40 are disposed, but one of them can be omitted. In this case, the small selection unit 44 can also be omitted.

In the case where the second overrun prevention coefficient calculation unit 40 is omitted and the first overrun prevention coefficient calculation unit 39 is disposed, the condition determination unit 43 and the ON/OFF changeover unit 46 can also be omitted, and the first overrun prevention coefficient ks1 calculated by the first overrun prevention coefficient calculation unit 39 may be directly input to the 1/100 multiplication unit 47.

In the case where the second overrun prevention coefficient calculation unit 40 is omitted and the first overrun prevention coefficient calculation unit 39 is disposed, the pump displacement control means 50 performs the above-described controls 1) and 2) or 3). As a result, when the actual engine speed Ne exceeds the maximum rotation speed NeH of the engine 8, the displacement of the HST hydraulic pump 16 is adjusted so as to obtain the inching rate IRL which is higher than the inching rate IR corresponding to the brake stroke S. Therefore, it becomes difficult to transmit the driving force from the drive wheels 24 to the engine 8 in the overrun rotation speed range of the engine 8, and the overrun of the engine 8 can be prevented.

In the case where the first overrun prevention coefficient calculation unit 39 is omitted and the second overrun prevention coefficient calculation unit 40 is disposed, the pump displacement control means 50 performs the above-described control 4) and 5) or 6). As a result, if the actual engine speed Ne exceeds the commanded engine speed and the pressure time-rate-of-change on the intake side of the HST hydraulic pump 16 becomes a prescribed value or more, the displacement of the HST hydraulic pump is adjusted so as to obtain the inching rate higher than the inching rate corresponding to the brake stroke. As a result, a sudden increase of the engine speed can be suppressed, and the overrun of the engine 8 can be prevented.

Figure 7:
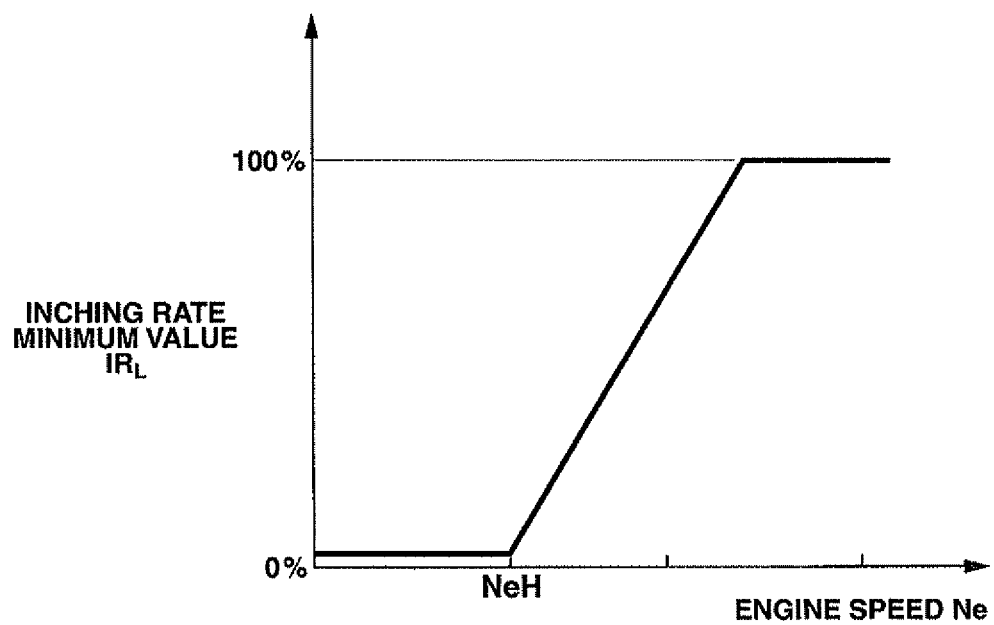
FIG. 7 is a diagram showing a correspondence relationship between an engine speed and an inching rate minimum value.

In FIG. 6, the first overrun prevention coefficient ks1 is determined on the basis of the actual engine speed Ne, and the inching rate minimum value IRL is computed on the basis of the first overrun prevention coefficient ks1. But, it is also possible to determine directly the inching rate minimum value IRL on the basis of the actual engine speed Ne by setting, in advance, the correspondence relationship between the actual engine speed Ne and the inching rate minimum value IRL as shown in FIG. 7. FIG. 7 shows the setting that, if the actual engine speed Ne exceeds the maximum rotation speed NeH of the engine 8, the higher the actual engine speed No becomes, the higher the minimum value IRL of the inching rate becomes gradually from 0%, and, after it reaches 100% at a prescribed rotation speed, 100% is kept.

In this case, the inching rate minimum value IRL obtained in FIG. 7 is directly input to the large selection unit 49 of FIG. 6 to perform the above-described controls 1) and 2) or 3).

Figure 8:
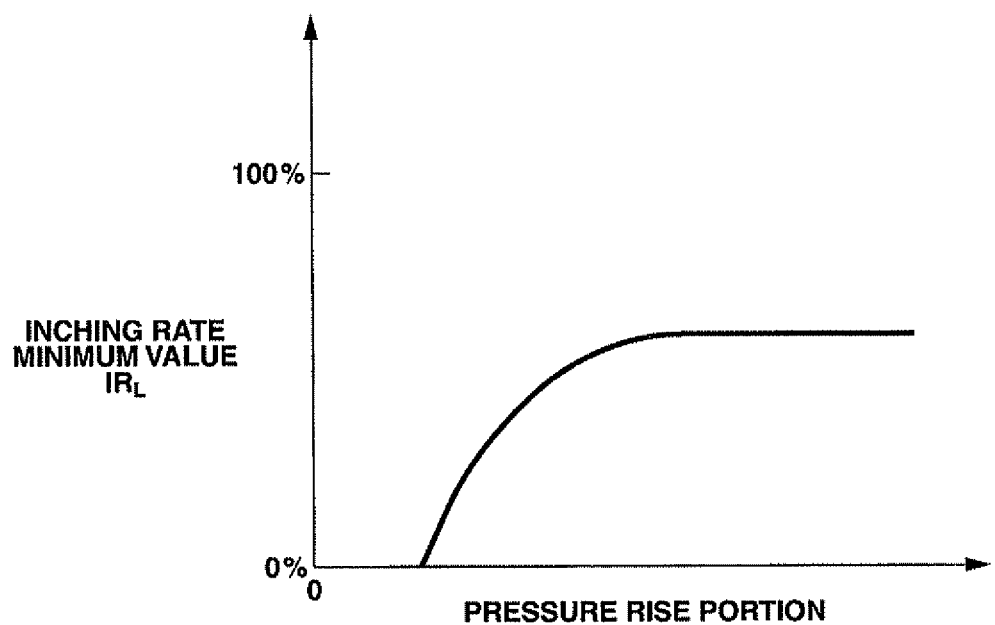
FIG. 8 is a diagram showing a correspondence relationship between a pressure rise portion and an inching rate minimum value.

Similarly, in FIG. 6, the second overrun prevention coefficient ks2 is determined on the basis of the pressure rise portion, and the inching rate minimum value IRL is computed on the basis of the second overrun prevention coefficient ks2. But, it is also possible to determine directly the inching rate minimum value IRL on the basis of the pressure rise portion by setting, in advance, the correspondence relationship between the pressure rise portion and the inching rate minimum value IRL as shown in FIG. 8. FIG. 8 shows the setting that, if the pressure rise portion becomes a prescribed value or more, the higher the pressure time-rate-of-change becomes, the higher the inching rate minimum value IRL becomes gradually from 0% and, when the pressure rise portion reaches the prescribed value, the inching rate minimum value IRL saturates and then, the fixed value is kept.

In this case, the inching rate minimum value IRL obtained in FIG. 8 is directly input to the large selection unit 49 of FIG. 6 via the ON/OFF changeover unit 46 to perform the above-described controls 4) and 5) or 6).

Similar to the embodiment of FIG. 6, it is also possible that a smaller one is selected between the inching rate minimum value IRL obtained in FIG. 7 and the inching rate minimum value IRL obtained in FIG. 8 by the small selection unit 44, and the smaller one value is directly input to the large selection unit 49 of FIG. 6 via the ON/OFF changeover unit 46. In this case, similar to the embodiment of FIG. 6, the above-described controls 1) and 2) or 3) and 4) and 5) or 6) are performed.

According to the embodiment described above, the overrun of the engine 8 can be prevented without advancing the action of the mechanical brake work. As a result, the energy loss is suppressed, and problems such as degradation in fuel efficiency and degradation in cooling capacity of the brake device can be solved. And, in FIG. 2, it becomes possible to form the lap amount small by shifting the characteristic L1 to the right in the drawing to obtain the characteristic L1' (indicated by an alternate long and short dash line). Therefore, a degree of freedom of adjustment of the lap amount is expanded, and it becomes possible to adjust flexibly the operation feeling and the like of the brake operating means 26.

The invention claimed is:

1. An engine-overrun-preventing control device for a work vehicle, comprising:
   an engine,
   a working machine hydraulic pump and an HST hydraulic pump which are driven by the engine used as a drive source,
   a hydro-static transmission which is configured to include the HST hydraulic pump and transmits a driving force of the engine to drive wheels,
   accelerator operating means,
   engine speed control means for controlling the engine to obtain a commanded engine speed corresponding to an accelerator opening of the accelerator operating means,
   brake operating means,
   a brake device for braking the drive wheels by generating a brake force in accordance with a brake stroke of the brake operating means,
   inching rate setting means for setting a correspondence relationship between the brake stroke of the brake operating means and an inching rate,
   engine speed detection means for detecting an actual engine speed of the engine,
   pressure time-rate-of-change measuring means for measuring a pressure time-rate-of-change on an intake side of the HST hydraulic pump, and
   pump displacement control means which, when the actual engine speed detected by the engine speed detection means is within the commanded engine speed, adjusts the displacement of the HST hydraulic pump so as to obtain an inching rate set by the inching rate setting means corresponding to the brake stroke of the brake operating means and which, when the actual engine speed detected by the engine speed detection means exceeds the commanded engine speed and when the pressure time-rate-of-change on the intake side of the HST hydraulic pump measured by the pressure time-rate-of-change measuring means becomes a prescribed value or more, adjusts the displacement of the HST hydraulic pump so as to obtain an inching rate higher than the inching rate set by the inching rate setting means corresponding to the brake stroke of the brake operating means.

2. The engine-overrun-preventing control device for a work vehicle according to claim 1, wherein:

when the actual engine speed detected by the engine speed detection means exceeds the commanded engine speed and when the pressure time-rate-of-change on the intake side of the HST hydraulic pump measured by the pressure time-rate-of-change measuring means becomes the prescribed value or more, a minimum value of the inching rate is set such that the higher the pressure time-rate-of-change rate is, the higher the minimum value of the inching rate is set, and the displacement of the HST hydraulic pump is adjusted so as to obtain a higher inching rate of a minimum value of the inching rate corresponding to the pressure time-rate-of-change and the inching rate set by the inching rate setting means corresponding to the brake stroke of the brake operating means.

3. An engine-overrun-preventing control device for a work vehicle, comprising:

an engine, a working machine hydraulic pump and an HST hydraulic pump which are driven by the engine used as a drive source, a hydro-static transmission which is configured to include the HST hydraulic pump and transmits a driving force of the engine to drive wheels, accelerator operating means, engine speed control means for controlling the engine so as to obtain a commanded engine speed corresponding to an accelerator opening degree of the accelerator operating means, brake operating means, a brake device for braking the drive wheels by generating a brake force in accordance with a brake stroke of the brake operating means, inching rate setting means for setting a correspondence relationship between the brake stroke of the brake operating means and an inching rate, engine speed detection means for detecting an actual engine speed of the engine, and pump displacement control means which, when the actual engine speed detected by the engine speed detection means is within a prescribed rotation speed, adjusts the displacement of the HST hydraulic pump so as to obtain an inching rate set by the inching rate setting means corresponding to the brake stroke of the brake operating means and which, when the actual engine speed detected by the engine speed detection means exceeds the prescribed rotation speed, adjusts the displacement of the HST hydraulic pump so as to obtain an inching rate higher than the inching rate set by the inching rate setting means corresponding to the brake stroke of the brake operating means, wherein when the actual engine speed detected by the engine speed detection means exceeds the prescribed rotation speed, a minimum value of the inching rate is set such that the higher the actual engine speed is, the higher the minimum value of the inching rate is set, and the displacement of the HST hydraulic pump is adjusted so as to obtain a higher inching rate in accordance with a higher one of (i) a minimum value of the inching rate corresponding to the actual engine speed which exceeds the prescribed rotation speed and (ii) the inching rate set by the inching rate setting means corresponding to the brake stroke of the brake operating means, the minimum value of the inching rate being gradually increased as a function of engine speed increase above the prescribed rotation speed.

4. The engine-overrun-preventing control device for a work vehicle according to claim 3, wherein:

the brake operating means is a brake pedal; and the brake device is disposed on an axle of the work vehicle.

* * * * *